INVENTOR.
GENE R. OLSON

United States Patent Office 3,116,810
Patented Jan. 7, 1964

3,116,810
LUBRICATING DEVICES
Gene R. Olson, 121 N. 120th St., Milwaukee, Wis.
Filed Oct. 17, 1961, Ser. No. 145,642
2 Claims. (Cl. 184—15)

This invention relates to automatic lubricating systems and more particularly to an apparatus employed for lubricating conveyor chains.

It is important in overhead conveyor chains that the chain be lubricated without spray or drippage. This is especially true in food processing plants or when conveying finished products. It is also important that every pin, link or roller on the chain have oil applied at the proper time and spot, regardless of the speed of the conveyor chain.

The major purpose of the present invention is to provide an automatic lubricating system for conveyor chains which is so formed and arranged as to properly distribute lubricant through stationary nozzles to a plurality of selected points on the conveyor chain while the chain is in motion.

Another purpose of the invention is to arrange an automatic lubricating system for conveyor chains so that a very minute quantity of lubricant may be distributed to various preselected points on the chain, with attendant elimination or minimization of leakage or drippage from the chain.

Another purpose of my invention is to provide a device designed for either continuous or periodic lubrication of a conveyor chain.

A still further purpose of my invention is to provide a device that may be manually or mechanically started and stopped at period intervals.

The apparatus illustrated, described and claimed herein provides an accurately measured fixed amount of oil in the proper places on the chain. The device dispenses oil in liquid form and minimizes the build up of wasted oil on the floor and the surrounding structure, which is true when the "spray" type or "brush" type of lubrication is employed. The design is such that the quantity of oil being dispensed is fixed and will not vary regardless of the oil viscosity, oil temperature or speed of the conveyor. It may be manually or mechanically made active or inactive for continuous or periodic operation. It is easily installed or applied to the conveyor rail and provides a means of reducing wear and maintenance on both the chain and the driving unit. It minimizes costly breakdowns and much labor in the proper maintenance of the conveyor.

Figure 1:
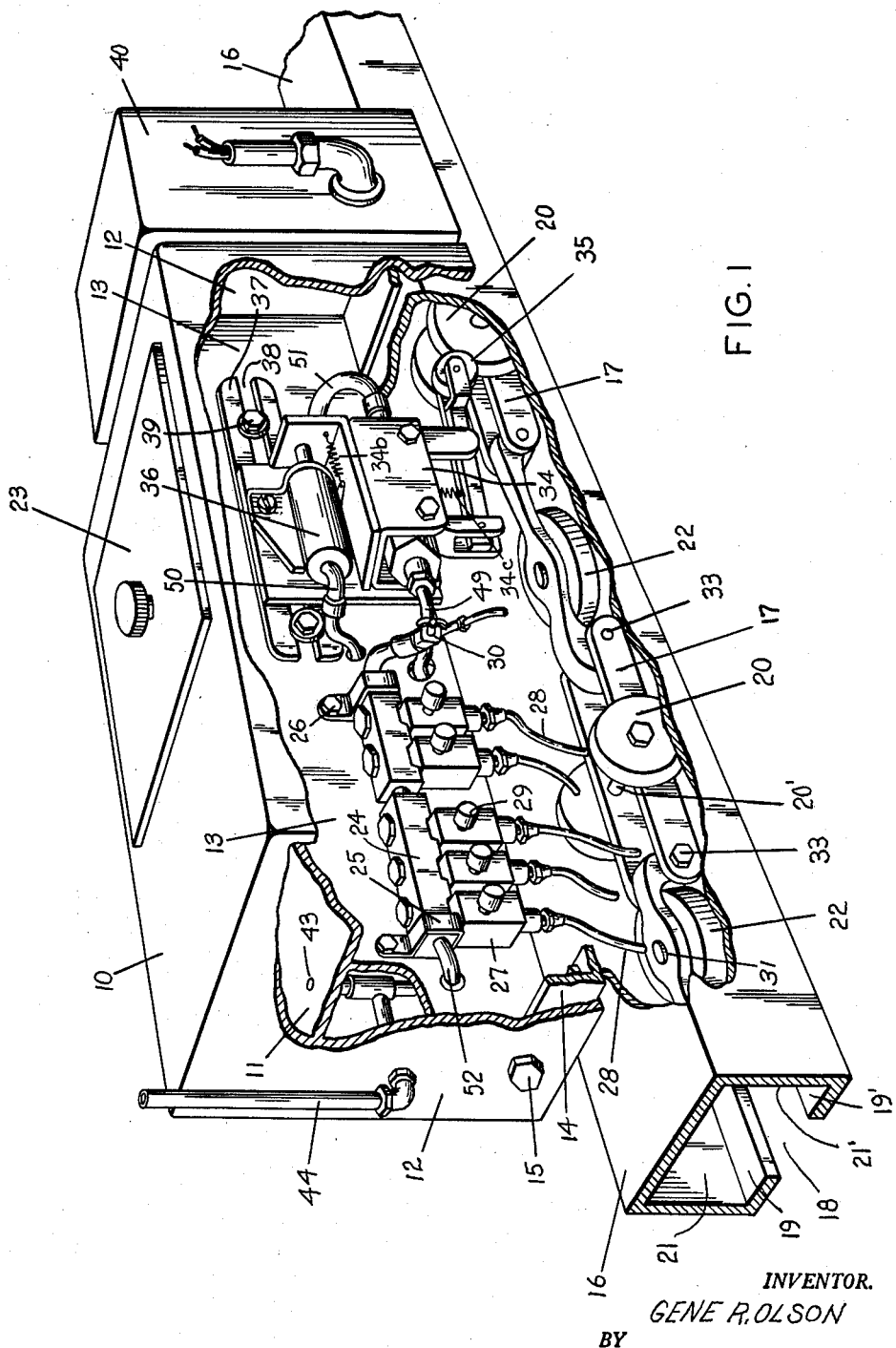
Figure 2:
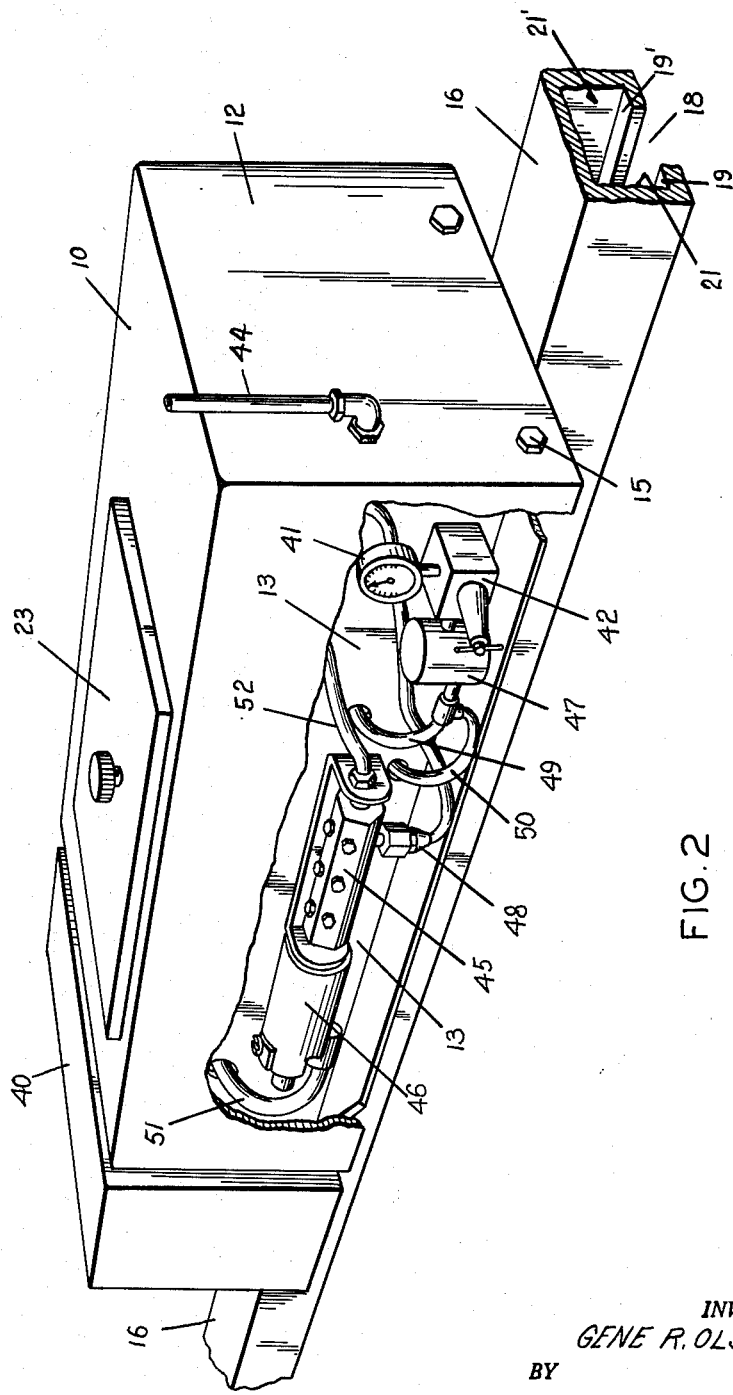

Other and further objects of my invention will become more apparent as the description proceeds when taken in conjunction with the accompanying drawings, in which:

FIGURE 1 is a fragmentary perspective view of the entire assembled device showing various portions in cross section and showing the device mounted onto a channeled chain guide; and FIGURE 2 is a similar view showing the opposite side of the assembled unit.

Similar characters of reference indicate corresponding parts throughout the several views and referring specifically now to the same, the character 10 shows the housing of the device, which may be integrally constructed of cast or sheet metal or the like. The housing is formed to provide an oil reservoir 11 which may be of any size, shape or contour, at its upper portion. The housing has a pair of vertical end plates 12 and 12' and a centrally disposed vertical supporting plate 13 extending longitudinally from the inner faces of one end plate to the other.

The vertical end plates are provided with laterally disposed angles 14 attached to the inner faces of the end plates 12 and 12' at their lower edge by means of the screws or bolts shown as 15, or in any other practical manner. The angles 14 enable mounting of the entire assembled unit to the upper surface of the channel 16 acting as a guide track for the assembled overhead chain, generally shown at 17.

The channel 16 is of a conventional design having a longitudinal opening 18 at its bottom and a pair of inwardly extending surfaces 19 and 19' for supporting the vertical supporting rollers 20 of the chain assembly. The vertical walls 21 and 21' support the horizontal guide rollers 22 also forming a part of the assembled chain 17.

A cover 23 permits access to the interior of the housing and the contents of the oil reservoir 11.

Vertical plate 13 acts as a mounting means for the various operating parts of the assembly. By referring to FIGURE 1, it will be noted that a manifold 24 is supported on the plate 13 by means of straps 25 which are attached to the plate by means of the screws 26. Manifold 24 is in the form of a lineally extending tube and has a length sufficient to accommodate a plurality of ejectors 27, as shown by the five ejectors 27 in FIGURE 1. The manifold may be of any length necessary to accommodate more or less ejectors. Ejectors 27 are of a type which prevent oil flow except when manifold 24 is pressurized, as by the working stroke of a pump. A pliable tube 28 depends from each ejector. Adjustment knobs 29 are provided for each ejector to regulate flow rate. One end of the manifold 24 is provided with a bleed valve 30 shown in the form of a pet cock which is manually manipulated to permit exhausting air or the like that may accumulate in the manifold. The tubes 28 are made of deformable, substantially non-elastic material and thus are pliable to enable them to be bent to various positions, as shown in FIGURE 1, where their outlets are immediately above desired points to be lubricated on the chain, such as the center pin 31 supporting the horizontal rollers 22, or the horizontal shafts 20', supporting the vertical rollers 20, or the pins 33, supporting the links of the chain.

The top face of the channel 16 is cut out between the angles 14 fastened to the vertical end plates 12 and 12' to permit the tubes 28 to have their outlets above the selected points to be lubricated.

The tubes may be formed from one of a number of materials, such as copper.

A trip valve assembly is pivoted on plate 13 by means of pin 34a. The valve assembly is actuated by a hingedly mounted roller 35, which is adapted for contact with the outer peripheral surface of the vertical rollers 20 of the chain assembly.

The roller trip valve assembly 34 is pivoted on a bracket 37 which is adjustably mounted on the vertical mounting plate 13. Bracket 37 has open slots 38 accommodating mounting screws 39. Bracket 37 also supports an air cylinder 36 which has a plunger which is extensible against a portion of valve assembly 34 to cause the assembly to be lowered to the operative position shown in FIGURE 1. A spring 34b is adapted to withdraw valve assembly 34 upwardly when air is exhausted from cylinder 36. A spring 34c biases roller 35 downwardly toward the position illustrated in FIGURE 1. The object of the adjustable feature is to accommodate the variations in and speed of, the chain 17.

An electric control unit of any conventional type (not shown) may be mounted in the end enclosure.

An air gauge 41 may be mounted on an adjustable air control unit 42, which receives air under pressure from a source (not shown). Oil from the reservoir 11 is supplied to pump 45 through conduit 48 which is connected to reservoir port 43. A conventional oil gauge 44, consisting of a transparent gauge glass, furnishes a means of observing the volume of oil in the reservoir.

A conventional rod type pump 45 is supported on the plate 13, as shown in FIGURE 2. An air cylinder 46 is connected to pump 45 to cause actuation thereof. Cylinder 46 is a conventional type in which air delivered to one end thereof moves a piston to actuate the rod of pump 45 for its working stroke. A spring in cylinder 46 returns the piston when the air pressure drops.

A solenoid valve 47 is carried by the housing and when energized, supplies air to air cylinder 36 and the valve of valve assembly 34 through conduits 50 and 49, respectively. Valve 47 is a conventional three-way valve which in the energized state establishes communication between regulator 42 and the conduits 49 and 50. When deenergized the valve 47 exhausts any air from conduits 49 and 50 to the atmosphere.

The valve of valve unit 34 is a two-way valve which, when actuated by the raising of roller 35, establishes communication between conduit 49 and air cylinder 46 through conduit 51. When roller 35 drops, this valve simply opens conduit 51 to the atmosphere so that the piston in cylinder 46 can return under the action of its return spring, in readiness for another working stroke of pump 45.

In use, the entire assembly 10 is easily fixed to the supporting track for a conveyor chain as illustrated in the drawing. A portion of the supporting track 16 is easily cut away in order to accommodate the depending oil distributing tubes 28 and the trip roller assembly 34.

In the deenergized state of solenoid valve 47, valve 47 prevents communication between the source of air pressure (not shown) and the supply lines 49 and 50. These lines are then vented to the atmosphere. When solenoid valve 47 is energized, however, it establishes communication with the source of air pressure and the lines 49 and 50. Line 49 delivers air to the trip valve assembly 34 which is conditioned for operation through air delivery from passage 50 and actuation of the plunger of the air cylinder 36 which swings the trip valve assembly 34 into the position illustrated in FIGURE 1. When one of the supporting rollers 20 of the conveyor chain contacts the trip roller 35, it raises this roller against the action of spring 34c and actuates the valve to establish communication between lines 49 and 51. This in turn results in communication of the air pressure behind the piston in cylinder 46 and actuation of the pump 45 which delivers a predetermined quantity of the lubricating fluid through line 52 to the manifold 24. Manifold 24, in the operation condition of the assembly, is normally full of lubricating fluid and the additional fluid supplied thereto by reason of the actuation of pump 45 displaces an equal metered quantity of fluid through each of the several distributing tubes 28. Adjustment of the quantity of lubricant delivered to said manifold adjusts the quantity delivered from the tubes 28.

The system may be so arranged that a very small quantity of lubricating fluid is supplied through the tubes 28, for each working stroke of the cylinder 46 and pump 45, thus minimizing the tendency for the system to cause leakage or drippage of oil from the conveyor chain being lubricated. In this connection, the length of the working stroke of pump 45 may be adjusted for larger or smaller quantities of oil supplied to manifold 24, by adjusting the air pressure through regulator 42.

The solenoid valve 47 may be energized through clockwork disposed in the control compartment 40. The control system may be so arranged that the valve 47 is energized for a predetermined period of time which may, for example, be the time required for passage of all of the elements of the conveyor chain beneath the dispensing nozzles 28. The clockwork of the control system may be set to cause energization of solenoid valve 47 periodically, as, for example, every several hours, every day or once a week.

When the solenoid valve is deenergized, lines 49 and 50 are vented to the atmosphere through the atmospheric opening at the valve 47 and the trip valve unit 34 is returned to an upward position through the act of the spring 34b. In this position the roller 35 is positioned upwardly and away from the supporting rollers 20 of the chain.

The system is so designed that it easily accommodates various sizes of conveyor chains. In this regard, the pliable tubes 28 are easily adjusted for various widths of chains, and variant spacings between the supporting rollers 20 and between the hinge points 33 of the chain, as well as variant spacings between the supporting rollers 20 and the guide rollers 22. The adjustability of the nozzles enables use of a simple oil manifold for all of the nozzles.

The valve in unit 34 is a conventional two-way valve so that upon upward movement of the roller 35 the valve establishes communication between the lines 49 and 51, whereas upon return of the roller 35 to the deactivated position, line 51 is simply vented to the atmosphere to allow return of the piston in cylinder 46 and the pump rod in pump 45, in readiness for another working stroke.

The pliable oil delivery nozzles are also adjustable to accommodate variations of speed in the conveyor chain so that the oil delivered through the nozzles strikes the exact point to be lubricated. Similarly, valve unit 34 may be adjusted on the bolts 39 so as to vary the time at which the valve unit is activated to cause oil delivery with relation to the time when the chain elements are in proper position to receive oil from the tubes 28. This position varies with the speed of the chain and the adjustment of the valve unit accommodates speed variations.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A lubricant distributing system for conveyor chains including a housing adapted to be fixed to a supporting rail for a conveyor chain, said housing having a plurality of oil distributing nozzles supported therein at fixed positions for distributing lubricant to a plurality of points on a conveyor chain, a pump supported by said housing for delivering lubricant to said nozzles, an air cylinder for causing actuation of said pump, and means for periodically delivering air to said air cylinder to cause working of said pump and delivery of lubricant through said nozzles, including a valve unit having an actuating member formed and adapted for contact with a portion of the conveyor chain being lubricated and a second valve connected with and adapted when opened to deliver fluid to said valve unit, said valve unit being swingably mounted on said housing, and a second air cylinder being connected with said second valve, said second air cylinder being interconnected with said valve unit to cause swinging movement of said valve unit into a position disposing said actuating member for contact with said chain when said second valve is opened.

2. The structure of claim 1 wherein said valve unit and said second air cylinder are supported on a bracket, and said bracket is adjustably mounted on said housing in directions parallel to the direction of movement of said chain to thereby adjust the instant of actuation of said valve unit with relation to the passage of chain elements beneath said nozzles.

References Cited in the file of this patent

UNITED STATES PATENTS

| | | |
|---|---|---|
| 1,919,451 | Schaeffer | July 25, 1933 |
| 2,022,726 | Leach | Dec. 3, 1935 |
| 2,498,407 | Fine | Feb. 21, 1950 |
| 2,893,515 | Schweisthal | July 7, 1959 |
| 3,031,032 | Dinkelkamp et al. | Apr. 24, 1962 |